United States Patent [19]

Muller

[11] 4,012,883

[45] Mar. 22, 1977

[54] DEVICE FOR SECURING A BEAM TO SHEET PILING

[76] Inventor: Lüdwig Muller, 44-46 Heinrich-Heine Strasse, 3550 Marburg, Lahn, Germany

[22] Filed: July 8, 1975

[21] Appl. No.: 594,027

[30] Foreign Application Priority Data

July 10, 1974 Germany .................. 7423433

[52] U.S. Cl. .................. 52/729; 52/730; 61/39; 403/190; 403/256
[51] Int. Cl.² .................. E04B 1/343; E02D 5/00
[58] Field of Search .................. 52/729, 730, 758 C, 52/646, 648, 758 D; 403/188–193, 406, 271, 272, 260; 46/29; 61/39

[56] References Cited

UNITED STATES PATENTS

| 1,404,522 | 1/1922 | Harris | 403/190 |
| 1,865,284 | 6/1932 | Smith | 228/178 |
| 2,042,179 | 5/1936 | Leake | 402/188 |
| 2,156,155 | 4/1939 | Howard | 52/648 |
| 2,374,550 | 4/1945 | McIntosh | 403/189 |
| 2,456,055 | 12/1948 | Farrar | 403/406 |
| 2,911,242 | 11/1959 | Bickerstaff | 403/188 |

FOREIGN PATENTS OR APPLICATIONS

| 255,410 | 5/1963 | Australia | 403/260 |
| 895,749 | 4/1944 | France | 52/758 D |
| 590,754 | 1/1934 | Germany | 52/730 |
| 457,767 | 4/1936 | United Kingdom | 52/758 D |

*Primary Examiner*—Price C. Faw, Jr.
*Assistant Examiner*—James L. Ridgill, Jr.
*Attorney, Agent, or Firm*—Hane, Sullivan & Spiecens

[57] ABSTRACT

There is disclosed a device for fixedly attaching a double-T or an I-beam to a sheet piling. Such fixed attachment of the beam is effected by welding an anchor bolt to the rib of the beam and/or bracing bars which in turn are welded to the flanges of the beam. Such welding is effected prior to transporting the beam to the location for attaching it to the sheet piling. Due to the welding of the anchor bolt to the flanges or the rib of the beam, the beam can be driven into the ground with the anchor bolt already attached thereto. Mounting of the anchor bolt and thus of the beam is effected in a conventional manner by a screw connection and a hinge disc.

5 Claims, 7 Drawing Figures

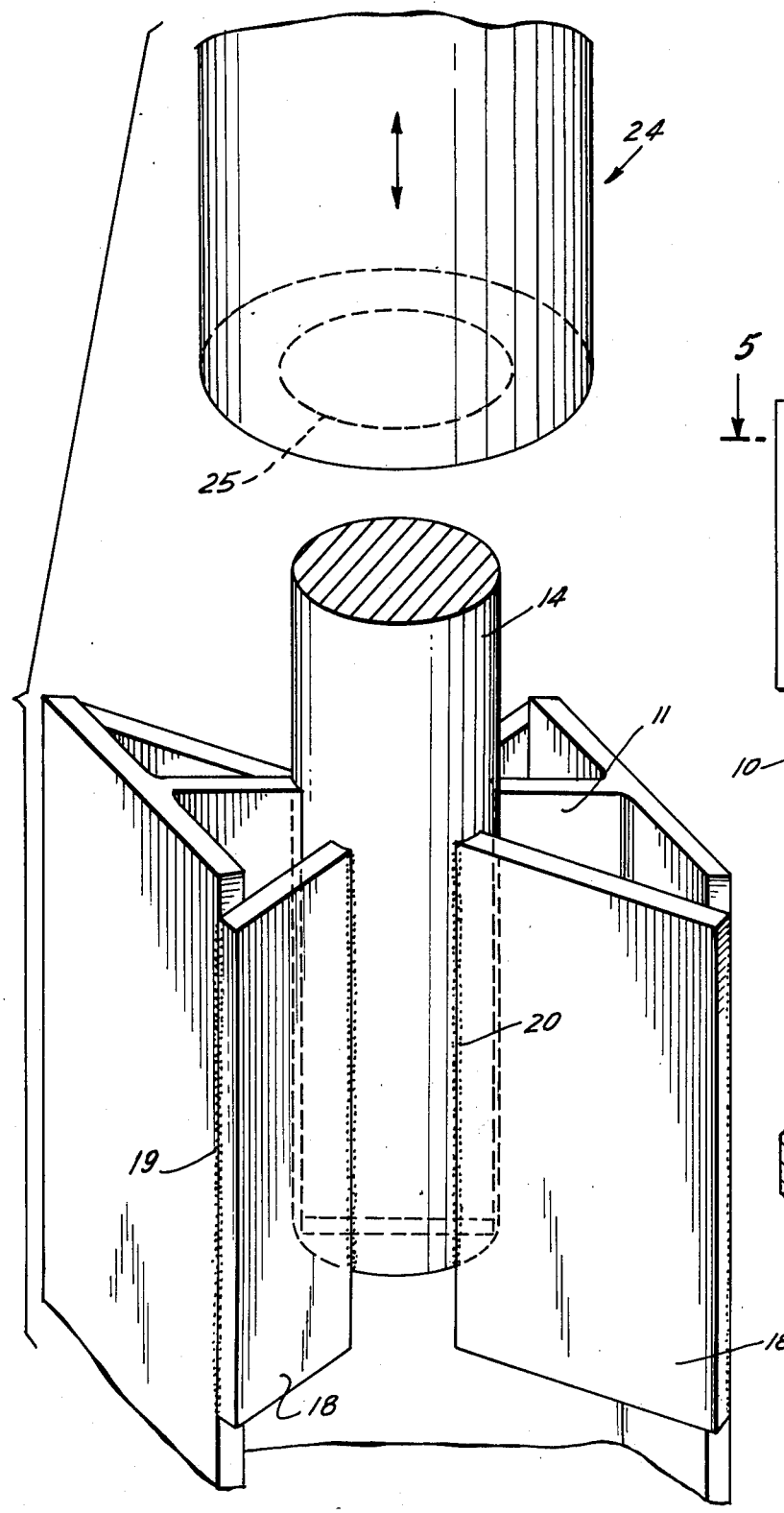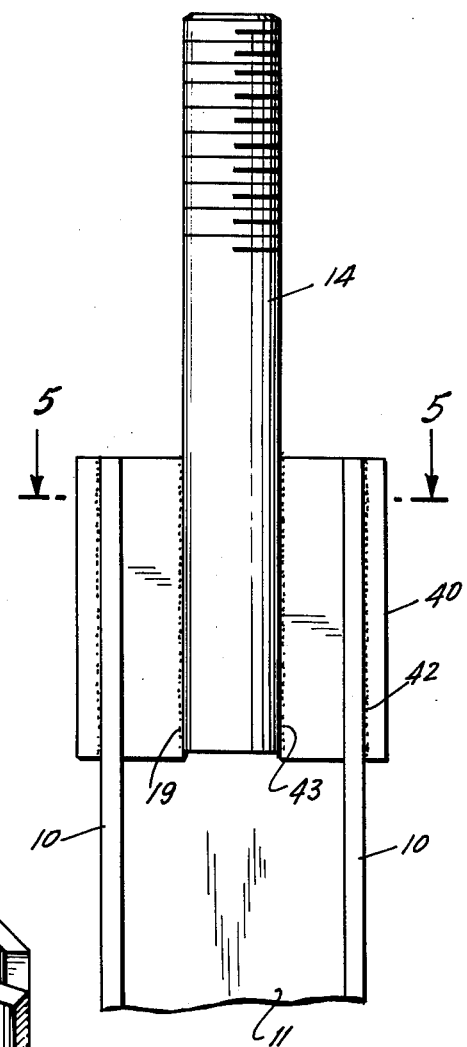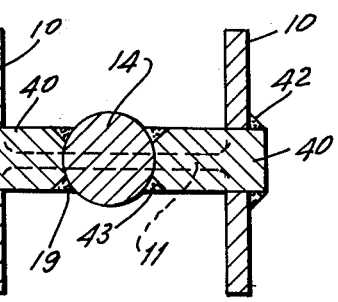

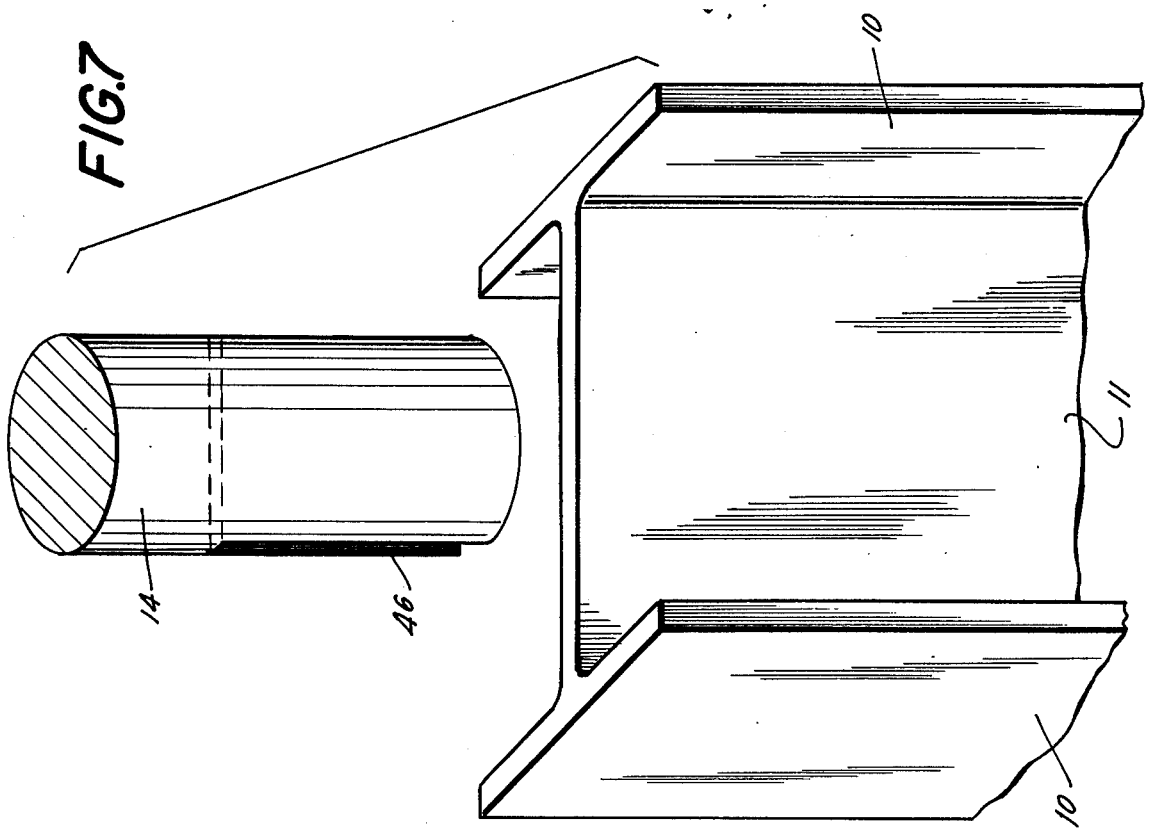
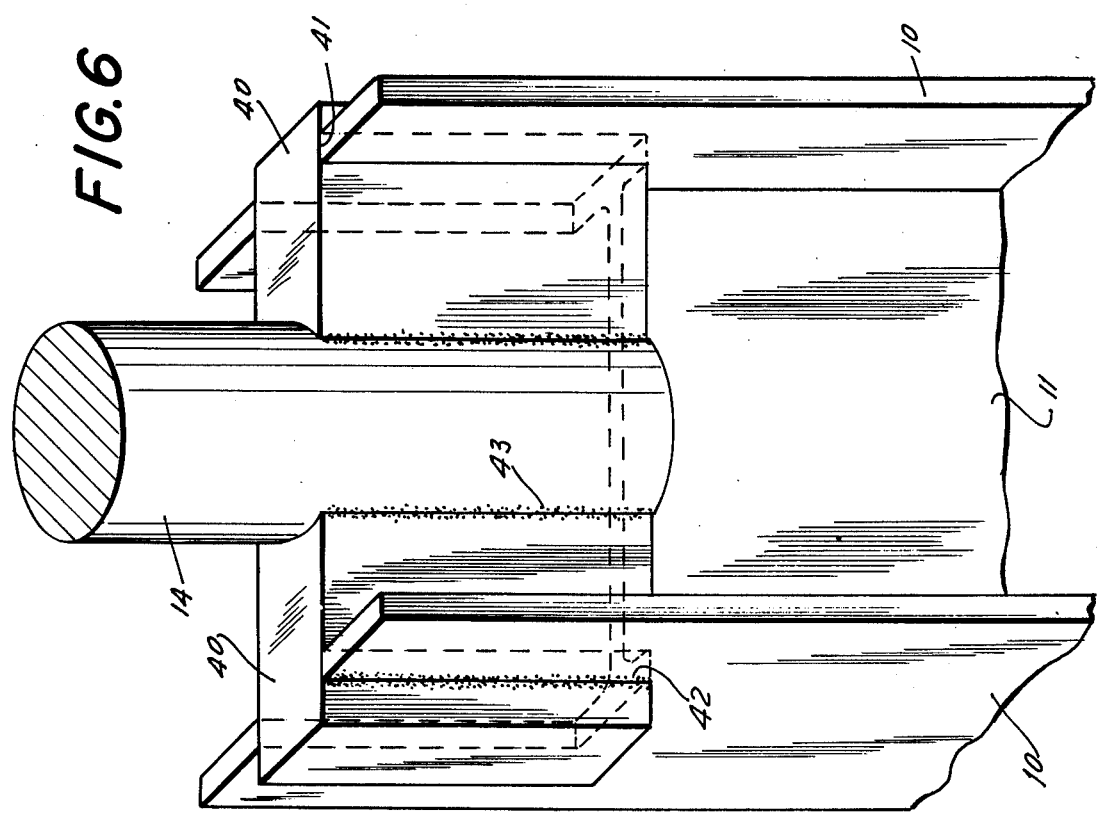

DEVICE FOR SECURING A BEAM TO SHEET PILING

The present invention relates to a device for securing a beam to sheet piling, and more particularly to securing a double-T or I-beam hingedly to sheet piling.

BACKGROUND

Anchoring of sheet pilings or bulkheads in position from the back side thereof is effected in many instances by slanted posts driven into the ground to obtain a pull action on the sheet piling. In many cases I-beams are used for the purpose. In the event the I-beam is not secured to a cross beam or bracket on the sheet piling but is secured to the sheet piling proper, it is necessary that for static reasons the I-beam is secured to the piling in a slanted position.

It is known to attach such I-beam to the sheet piling by a bracket or console welded to the beam head and a cylindrical steel pin with a suitable eye. A hinge bolt is then extended through the eye. This bolt simultaneously locks the console or bracket to the sheet piling.

The disadvantage of this known arrangement is that the bracket on the beam after ramming or driving the I-beam into the ground must be welded on in situ, that is, in the construction area itself. Moreover, the welding seams must extend partly over the beam head. As a result, the welding operations which have to be carried out in situ entail high demands on the skill of the welders as the entire safety and reliability of the attachment of the I-beam to the sheet piling depends upon the quality of the required weldings.

THE INVENTION

It is a broad object of the invention to provide a novel and improved device for securing a double-T or I-beam to sheet piling by means of which the beam together with an anchor bolt already welded to the beam can be rammed or driven into the ground so that subsequent in situ welding is eliminated or at least reduced to a minimum.

SUMMARY OF THE INVENTION

The afore-pointed out objects, features and advantages, and other objects, features and advantages which will be pointed out hereinafter and set forth in the appended claims constituting part of the application are obtained by providing an anchor bolt the diameter of which is less than the width of the rib of the double-T or I beam to which the bolt is to be secured. This anchor bolt is inserted into a cut-out provided in the rib of the beam and welded to the edges of the cut-out before the beam is transported to the construction site. The invention also provides that to obtain further steadying and support of the anchor bolt bracing bars are provided which at one end are welded to the anchor bolt and at the other end to the flanges of the beam.

As a result of such attachment of the anchor bolt to the I-beam, it is possible to complete all or at least most of the welding of the anchor bolt prior to the driving of the beam.

As the diameter of the anchor bolt is less than the width of the rib on the beam, it is possible that during the driving operation the driving head can impact directly upon the upper edges of the flanges and the rib of the beam. Accordingly, the beam with the anchor bolt already welded thereto can be driven into the ground.

The pivotal attachment of the anchor bolt to the pile sheeting is effected in a conventional manner by means of a hinge disc and a support bracket.

BRIEF DESCRIPTION OF THE INVENTION

In the accompanying drawing several preferred embodiments of the invention are shown by way of illustration and not by way of limitation.

In the drawing:

FIG. 3 is a fragmentary view, partly in section, of the device according to FIG. 1 and of a driving head for driving the beam into the ground;

FIG. 4 is an elevational schematic view of a modification of the device according to the invention;

FIG. 5 is a cross section taken at line 5—5 of FIG. 4;

FIG. 6 is a fragmentary perspective view of the device as shown in FIGS. 4 and 5; and FIG. 7 is a perspective exploded view of a further modification of the device according to the invention.

DETAILED DESCRIPTION OF THE INVENTION

Figure 1:
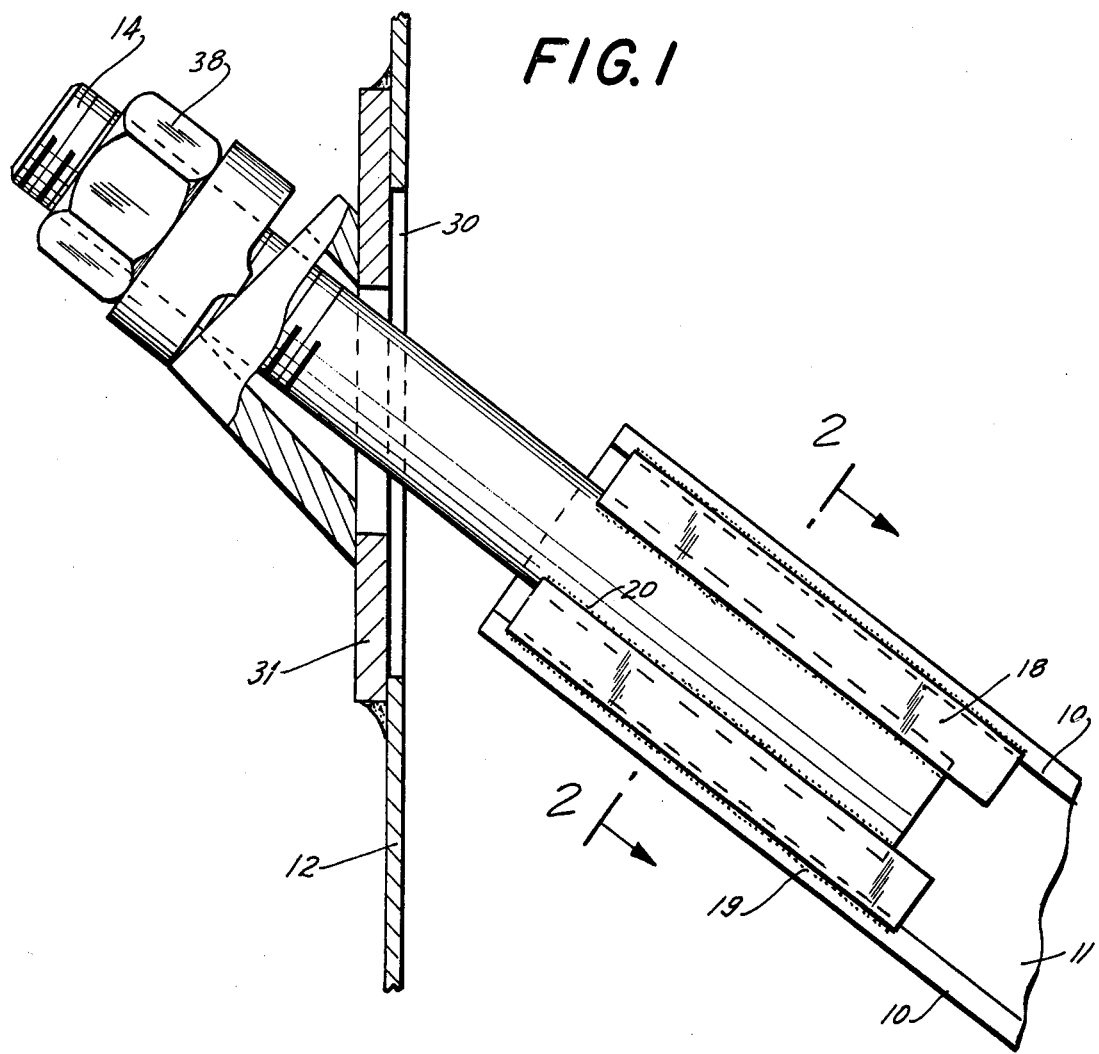
FIG. 1 is an elevational view, partly in section, of the device according to the invention for securing a "double-T" or "I" beam to a sheet piling.

Referring now to the drawing figures in detail, and first to FIG. 1, this Figure shows a double-T or I beam having flanges cross bars 10 joined by a web or rib 11. This beam is secured to a sheet piling 12 of conventional design by means of the device according to the invention.

Figure 2:
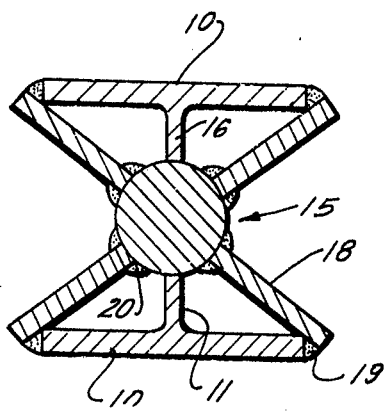
FIG. 2 is a section taken on line 2—2 of FIG. 1.

The device comprises an anchor bolt 14 which is secured to the I beam by providing an appropriately dimensioned cut-out 15 in rib 11. As it is shown in FIGS. 2 and 3, the diameter of the anchor bolt is less than the width of rib 11 and also slightly less than the width of the cut-out in rib 11 to permit formation of solid welding seams 16 securing the bolt to the rib and thus to the beam. To strengthen the attachment of the anchor bolt to the I beam there are provided several, preferably four, bracing brackets 18 each of which is welded at one end to the respective flange 10 and at the other end to the anchor bolt as it is indicated by reference numerals 19 and 20.

As previously explained, welding the afore-described welding joints for strongly joining the anchor bolt to the I beam can be, and in practice are, made in the plant rather than in situ, thus not only assuring a superior level of workmanship than can usually be obtained with welding in the construction location, but also simplifying the actual installation of the I beam.

Referring now to FIG. 3, this Figure shows, in addition to the details of welding the anchor bolt to the I beam, the manner by which the beam with the anchor bolt already welded thereto can be driven into the ground without requiring welding operation in situ.

As it is indicated in FIG. 1, driving of the beam for the purpose of steadying and supporting a sheet piling is usually effected by slanting the beam at an angle suitable for the specific construction involved. There is shown in FIG. 3 a driving head 24 which is essentially in the form of a hollow tube of sufficient strength. The diameter of the space 25 within the driving head is larger than the diameter of the anchor bolt 14 so that the driving head can be slipped over the anchor bolt and brought into direct driving engagement with the top edges of the flanges 10 and the rib 11. As it is clearly shown in FIG. 3, the bracing bars 18 terminate somewhat short of the top edges of the beam as it would not be advantageous to expose the bracing bars to the impact of the driving head as the bracing bars are usually made of a gauge not designed to sustain the heavy impacts involved.

Reverting now to FIG. 1, after the I beam has been driven into the ground, it must be secured to the sheet piling. For this purpose, the sheet piling 12 is provided with a suitably placed opening 30 and a suitably strong support plate 31, secured preferably by welding to the sheet piling. As is shown in FIG. 1, the anchor bolt has a length such that is protrudes from the upper end of the beam and it terminates in threads 14a. A hollow bracket 35, slanted at one edge, as it is shown in the Figure, is slipped upon the portion of the anchor bolt protruding from support plate 31. The inner diameter of the bracket is such that there is sufficient play for accommodating, within limits, various angular portions of the beam, and thus, of the anchor bolt, relative to the sheet piling. FIG. 1 shows the anchor bolt to be positioned somewhat out of line with the center axis of bracket 35. To lock the beam at various slanting positions of the beam and thus of the anchor bolt, there is provided a swivel disc 36 with two diametrically opposite noses 36a (only one nose being visible) abutting against the top edge of bracket 36. The disc is shown in a slanted position relative to the plane of the top edge of the bracket, to compensate for the off-position of the beam relative to the sheet piling.

The entire assembly is releasably fixed in position by a nut 38 screwed upon the anchor bolt.

As it is clearly shown in FIGS. 2 and 3, the bracing bars 18 are disposed diagonally relative to beam flanges 10. FIGS. 4 to 6 show an embodiment of the invention in which the bracing bars are disposed normal to flanges 10 of the I beam.

Referring to FIGS. 4 to 6 there is shown that two bracing bars 40 are provided, which are fitted into suitable cut-outs 41 in the flanges 10 and also in rib 11 of the beam. The bars are shown to be made of heavier gauge than the previously described bracing bars 18 as they must sustain the driving impact of a driving head as shown in FIG. 3. The bracing bars are welded to the flanges by welding seams 42 and to the anchor bolt by welding seams 43.

The welding operations again can be all carried out at the plant, thereby avoiding expensive and difficult welding operations in situ. Mounting of the device as shown in FIGS. 4 to 6 is in the same manner as has been described in connection with FIG. 1.

FIG. 7 shows an embodiment of the device in which the anchor bolt is secured to rib 11 of the I beam without requiring a cut-out in the flanges or the rib of the beam of the kind previously described; instead, the anchor bolt 14 itself is provided with a lengthwise elongate slot 46 the width of which is such that the bolt can be slid upon rib 11 to which it is secured by welding joints made in the plant rather than in situ. If it be deemed advantageous the anchor bolt can be further steadied by providing bracing bars of the type shown in FIGS. 2 and 3.

The mounting of the device according to FIG. 7 to a sheet piling is evident from the previous description.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A fastening device on a double-T beam to be driven into the ground and then to be secured at its head end to a sheet piling, said device comprising:
 a double-T beam having a web and two cross arms;
 an anchor bolt having at one end a lengthwise elongate slot fitting the thickness of the web of the beam, said bolt being inserted at its slotted end upon said web, the length of the anchor bolt being such that it protrudes from the respective end of the beam;
 welding joints securing the anchor bolt in said inserted position to the web;
 bracing bars inwardly extending from wall portions of each of the cross bars of said beam, one end of each of said bracing bars being welded to the respective cross bars and the other end to said anchor bolt; and
 fastening means for securing said anchor bolt to a sheet piling.

2. A fastening device on a double-T beam to be driven into the ground and then to be secured at its head end to a sheet piling, said device comprising:
 a double-T beam having in its web at the end of the beam to be subjected to a driving impact an axially elongate slot;
 an anchor bolt inserted into the slot, the length of said slot being such that the bolt protrudes from said end of the beam;
 welding seams welding the anchor bolt to the web along the length of the slot therein;
 bracing bars inwardly extending from wall portions of each of the cross bars of said beam one end of each of said bracing bars being welded to the respective cross bars and the other end to said anchor bolt; and
 fastening means attachable to said anchor bolt and to a sheet piling thereby securing said beam end to the sheet piling.

3. The device according to claim 2 wherein said bracing bars are diagonally disposed relative to the cross bars of the beam.

4. The device according to claim 2 wherein each of the cross bars of the beam includes a lengthwise slot extending from the end of the beam having the anchor bolt attached thereto, said slots in the cross bars being aligned with said slot in the web, and wherein a bracing bar is inserted into each of said cross bar slots, each of said bracing bars being welded at one end to the respective cross bar and at the other end to the anchor bolt.

5. The device according to claim 2 wherein the width of said slot is less than the peripheral outline of said anchor bolt.

* * * * *